United States Patent [19]
Iijima et al.

[11] Patent Number: 6,150,018
[45] Date of Patent: Nov. 21, 2000

[54] CONDUCTIVE FLOORING INSTALLATION METHOD AND ELECTROCONDUCTIVE WELDING ROD

[75] Inventors: Toru Iijima, Tokyo; Rikio Sugimoto, Kawagoe; Eiichi Tajima, Tokyo, all of Japan

[73] Assignee: Tajioma Incorporated, Tokyo, Japan

[21] Appl. No.: 07/804,395

[22] Filed: Dec. 10, 1991

[51] Int. Cl.⁷ ..................................................... D02G 3/00
[52] U.S. Cl. ......................... 428/375; 428/378; 428/557; 428/546; 427/59; 427/316; 427/419.8
[58] Field of Search ................................... 428/375, 546, 428/364, 378, 551, 556, 557; 219/137.2, 136, 145.22; 427/316, 59, 419.5, 419.8

[56] References Cited

U.S. PATENT DOCUMENTS

| | | | |
|---|---|---|---|
| 3,620,830 | 11/1971 | Kramer | 219/146.31 |
| 3,701,444 | 10/1972 | Clement et al. | 219/145.22 |
| 3,874,921 | 4/1975 | Todd | 428/418 |
| 4,421,582 | 12/1983 | Horsma et al. | 428/212 |

*Primary Examiner*—Merrick Dixon
*Attorney, Agent, or Firm*—Oblon, Spivak, McClelland, Maier & Neustadt, P.C.

[57] ABSTRACT

A method for installing an electroconductive flooring and an electroconductive welding rod for use in this method are disclosed. The electroconductive welding rod is composed of a joint material including as the main component a thermoplastic resin composition of a ribbon-shape or a rod-shape, with the peripheral surface thereof being coated with an electroconductive coating material. The method for installing the electroconductive flooring is composed of the steps of laying flooring sheets in mutual contact and cutting joint-forming grooves, or laying the flooring sheets with spaces therebetween for the formation of the joints of the adjacent flooring sheets, softening the electroconductive welding rod, filling the softened electroconductive welding rod into the grooves or the spaces between the flooring sheets, and welding the adjacent flooring sheets to form joints, whereby the flooring sheets are electrically integrated.

7 Claims, 6 Drawing Sheets

CONDUCTIVE FLOORING INSTALLATION METHOD AND ELECTROCONDUCTIVE WELDING ROD

FIELD OF THE INVENTION

The present invention relates to a method of installing an electroconductive flooring and to a electroconductive welding rod for forming a joint using the method of the invention.

DISCUSSION OF BACKGROUND

As the use of OA equipment has proliferated, it has become necessary to provide measures to counter static electricity within the general office space, and, in particular, in the computer room. Part of such activities concerns the provision of a proper degree of conductivity to the floors.

This type of electroconductive floor can be formed by laying electroconductive flooring sheets, but conventional flooring sheets use carbon black in some form or other as the material which provides conductivity. This creates the problem that the color of the floor must be some shade of black.

In recent years, however, electroconductive flooring sheets which use materials other than carbon black, such as carbon fiber, to provide electroconductivity, have been developed, so that flooring sheets in various colors have made an appearance. It has therefore become possible to install very colorful conductive floors.

However, because electricity will not flow between the installed flooring sheets these sheets must be made conductive in the direction of the thickness, reaching as far as the undersurface, and the sheets must be affixed using an electroconductive adhesive, or metallic joint sheets must be spread out in network form under the flooring sheets. Grounding terminals are generally provided at one or two points for every 100 to 400 $m^2$ of floor area to ground the floor. In such a case the distance between the locations where the static electricity is produced and the grounding terminal must be about 30 m or less. It is, however, very troublesome to form a network of aluminum foil or thin copper sheeting under the flooring sheets and the quality of work is generally poor. Problems such as exfoliation or bulging occur from loss of adhesive strength.

It is difficult to manufacture an electroconductive adhesive with a low resistance in a method of glueing flooring sheets with an electroconductive adhesive, and a good grounding effect is not necessarily demonstrated in the floor foundation to which the adhesive has been applied. A grounding device must therefore be utilized. In addition, when the grounding terminals are a considerable distance away, the resistance of the path becomes high so that the desired effect is not obtained. A building column is usually used as the grounding terminal, so in a large building such as a factory in which there are few columns there are many cases where it is not practical to provide a grounding terminal in the center of a room. The distance from the point where the static electricity is generated to the grounding terminal is therefore sometimes long. There are also occasions where the adhesive strength of the electroconductive adhesive is not adequate.

Japanese Utility Model Publication 1-29071 discloses a method of forming a joint between electroconductive flooring sheets, using a welding rod 61 with a triangular cross section as shown in FIG. 9, which is made of an electroconductive synthetic resin layer 63 extending from the vertex toward the base of the triangular cross section for almost half the height, with the remaining part of the welding rod 61 being formed from a non-electroconductive synthetic resin layer 65 of the same color as the surface layer of the flooring sheets. The flooring sheets are therefore electrically interconnected.

However, the operation of this type of welding rod is troublesome, and the strength of the formed joint is not always satisfactory.

There are many cases in which there are difficulties in forming an electrically integrated electroconductive flooring sheet when the welding rod 61 is used to form the joints. As illustrated in FIG. 10, when the joint is formed, the end sections of electroconductive long flooring sheets 21, 21 (hereinafter referred to as the flooring sheets 21) are butted together on the floor base 43 and are attached to the floor base by an adhesive 35. The joint grooves are cut out between the adjacent flooring sheets 21, 21 and these grooves are filled with the joint welding rod 61. The joint is then completed by cutting away the portion of the joint welding rod 61 which protrudes from the surface of the flooring sheets 21, 21. In order to make the joint inconspicuous, the surface of the joint should be formed from a non-electroconductive synthetic resin layer 65 which is the same color as a surface layer 21a of the flooring sheets 21. In addition, the flooring sheets 21, 21 are electrically integrated by the underlying electroconductive synthetic resin 63. However, in practice, there are many cases in which the electrical integration of the flooring sheets 21, 21 is inadequate. The reasons for this are as follows.

The flooring sheet 21 is usually formed by laminating a comparatively thin surface layer 21a, which has a low electrical resistance, to a comparatively thick base layer 21b with a high electrical resistance. Then, it is necessary to electrically integrate the surface layers 21a, 21a of adjacent flooring sheets to prevent the electrification of the floor surface. The integration of the adjacent surface layers 21a is provided by the joint welding rod shown in FIG. 10, and because the surface of the joint is formed from the non-electroconductive synthetic resin layer 65, the boundary line between the electroconductive synthetic resin 63 of the joint welding rod 61 and the non-electroconductive synthetic resin layer 65 must be reliably positioned at the thick region of the surface layer 21a. However, in general, the surface layer 21a of the flooring sheet 21 is about 0.2 to 1.5 mm thick, and the total thickness, including the thick base layer 21b, is about 2 to 6 mm. It is difficult to position the boundary line of the joint welding rod 61 in the thick region of the surface layer 21a. In particular this positioning is extremely difficult in consideration of the wide variation in the irregularities in the floor base 43 and the depth of cut of the joint groove.

In addition, it is also known that an electric charge in the floor can be prevented by forming an electroconductive joint using a non-electroconductive flooring sheet or securing with a metal rod (Japanese Laid-Open Utility Model Application 52-141829 and Japanese Laid-Open Patent Application 62-271399). However, with a method of this type, there is a limit to how well the electrification of the floor surface can be prevented so a satisfactory effect is not always obtained.

SUMMARY OF THE INVENTION

An object of the present invention is to provide, with due consideration to the drawbacks of such conventional methods, a method for installing an electroconductive flooring which includes only a small number of ground terminals.

Another object of the present invention is to provide an electroconductive welding rod to be used in installing the electroconductive flooring.

Specifically, the above objects of the present invention are achieved by a method for installing an electroconductive flooring comprising the steps of laying the flooring sheets in mutual contact and cutting joint-forming grooves, or laying the flooring sheets with spaces therebetween for the formation of the joints of the adjacent flooring sheets, softening an electroconductive welding rod which is composed of a joint material consisting essentially of a thermoplastic resin composition of a ribbon-shape or a rod-shape, with the peripheral surface thereof being coated with an electroconductive coating material, filling the softened electroconductive welding rod into the grooves or the spaces between the flooring sheets to form the joint, so that the flooring sheets are electrically integrated.

To install the electroconductive floor, it is preferable to lay the flooring sheets with in mutual contact and cutting joint-forming grooves, or laying the flooring sheets spaces therebetween for forming the joint, and to fill the electroconductive welding rod into the grooves or the spaces to weld the adjacent flooring sheets, leaving at least a portion of the welding material protruding from the surface of the flooring sheet. Next, when this protruding portion is removed after the joint is formed. Thus the flooring sheets are integrated electrically through the electroconductive coating material.

With this installation method for the electroconductive floor, the electroconductive floor can be easily installed using the flooring sheets and the jointing material. Furthermore, it is possible to cause static electricity to leak reliably, even when the grounding terminal is a considerable distance away.

In addition, the electroconductive welding rod can be easily manufactured as an electroconductive welding rod with the peripheral surface of the jointing material coated with an electroconductive coating material which is composed of a thermoplastic resin composition as the main component. Also, the joint can be easily formed and the flooring sheets can be integrated electrically using this welding rod with no adverse coloring effects.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
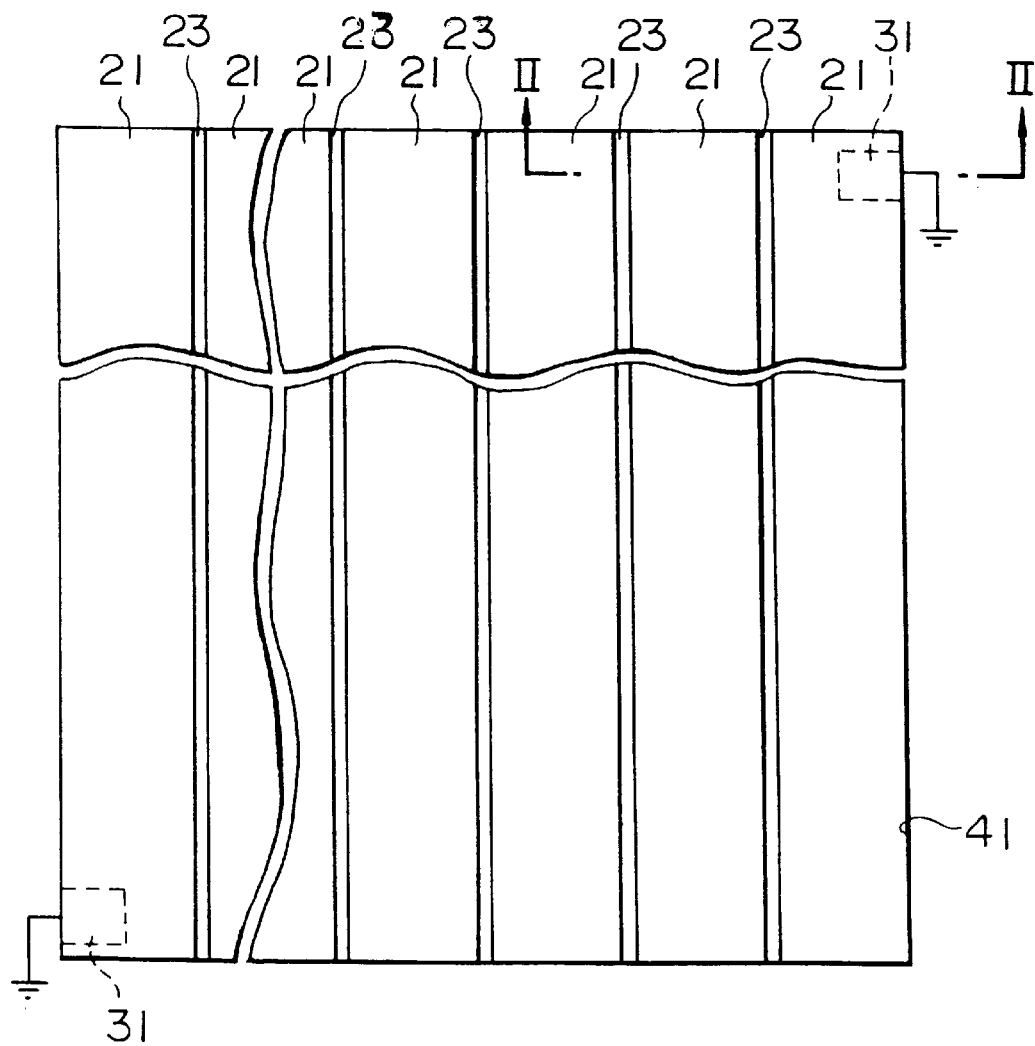
FIG. 1 is an explanatory view of one example of an installation method for an electroconductive flooring of the present invention.
Figure 2:
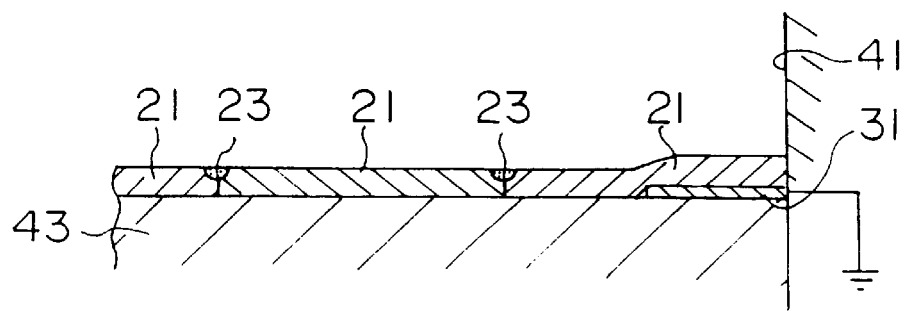
FIG. 2 is a partial sectional view taken on line II—II in FIG. 1.

FIG. 1 is a plan view with part omitted showing an example of an electroconductive floor installed by a method of the present invention. FIG. 2 is a partial sectional view taken on line II—II in FIG. 1. For convenience of illustration FIG. 1 and FIG. 2 are not drawn to scale. For example, a flooring sheet 21 can be 900 to 1800 mm wide and 1 to 10 mm thick, and a joint 23 can be about 2 to 10 mm in width.

Figure 4:
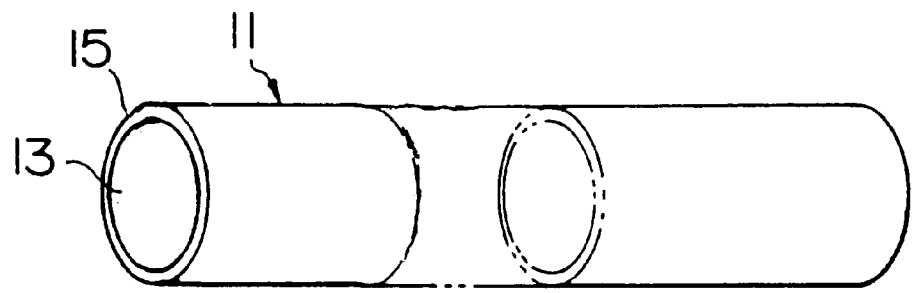
FIG. 4 is a perspective view of an example of an electroconductive welding rod of the present invention.
Figure 5:
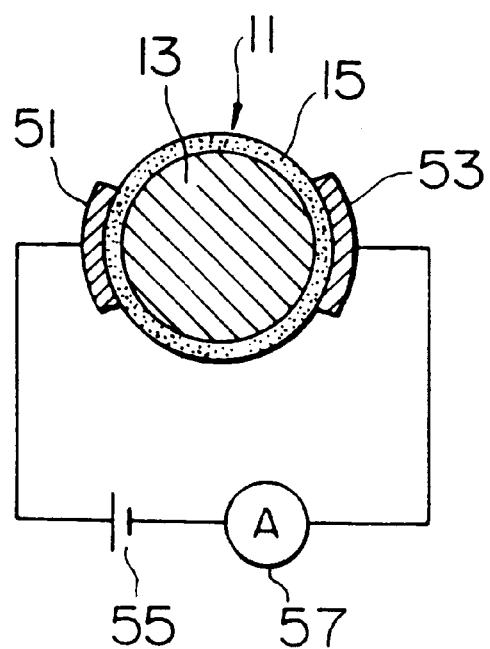
FIG. 5 is an explanatory view showing a method for measuring electric resistance values.

A plurality of electroconductive flooring sheets 21, 21 is installed in a line on a floor base 43 of a room 41 in a building, and affixed to the floor base 43 with an adhesive (not shown). A plurality of continuously extending electroconductive joints 23 are formed between these electroconductive flooring sheets 21, and by means of these electroconductive joints 23 the adjacent electroconductive flooring sheets 21 are electrically connected and integrally formed. The depiction of the structure of the electroconductive joints 23 in this drawing is simplified; the details of the structure are shown in FIG. 4 and subsequent drawings. In addition, a pair of grounding terminals 31 are provided, electrically connected to the electroconductive flooring sheets 21, one in each of two diagonally opposite corners of the room 41, beneath the electroconductive flooring sheets 21. The grounding terminals 31 are grounded on the framework of the building or through a grounding wire to the earth's surface. The electroconductive floor can be installed by applying an adhesive to the floor base 43 and laying the electroconductive flooring sheets 21 using an ordinary adhesive, without taking conductivity into consideration. It is therefore not necessary to spread a network of aluminum foil or the like. Furthermore, because the floor area handled by one grounding terminal 31 is large, a grounding terminal 31 in one or two corners of the room is sufficient. Static electricity generated by friction from, for example, a person walking on the surface of the floor is transmitted to the electroconductive flooring sheets 21 and the joints 23, and is rapidly leaked from the grounding terminal 31 so that static electricity, which is frequently linked to accidents, does not accumulate on the surface of the flooring sheets 21. A material which exhibits better conductivity than the flooring sheets 21 is preferably used for the joint 23, specifically, a material with low resistance. If such a material is used, the area which can be handled by one grounding terminal is increased. More specifically, the electroconductive joint 23 should be formed with a resistance in the order of $10^6 \Omega$ or less. If the resistance of the electroconductive flooring sheet 21 itself is rather low, for example, in the order of $10^3 \Omega$ or less, there is some concern that an accident will occur from reverse electric shock.

Figure 3:
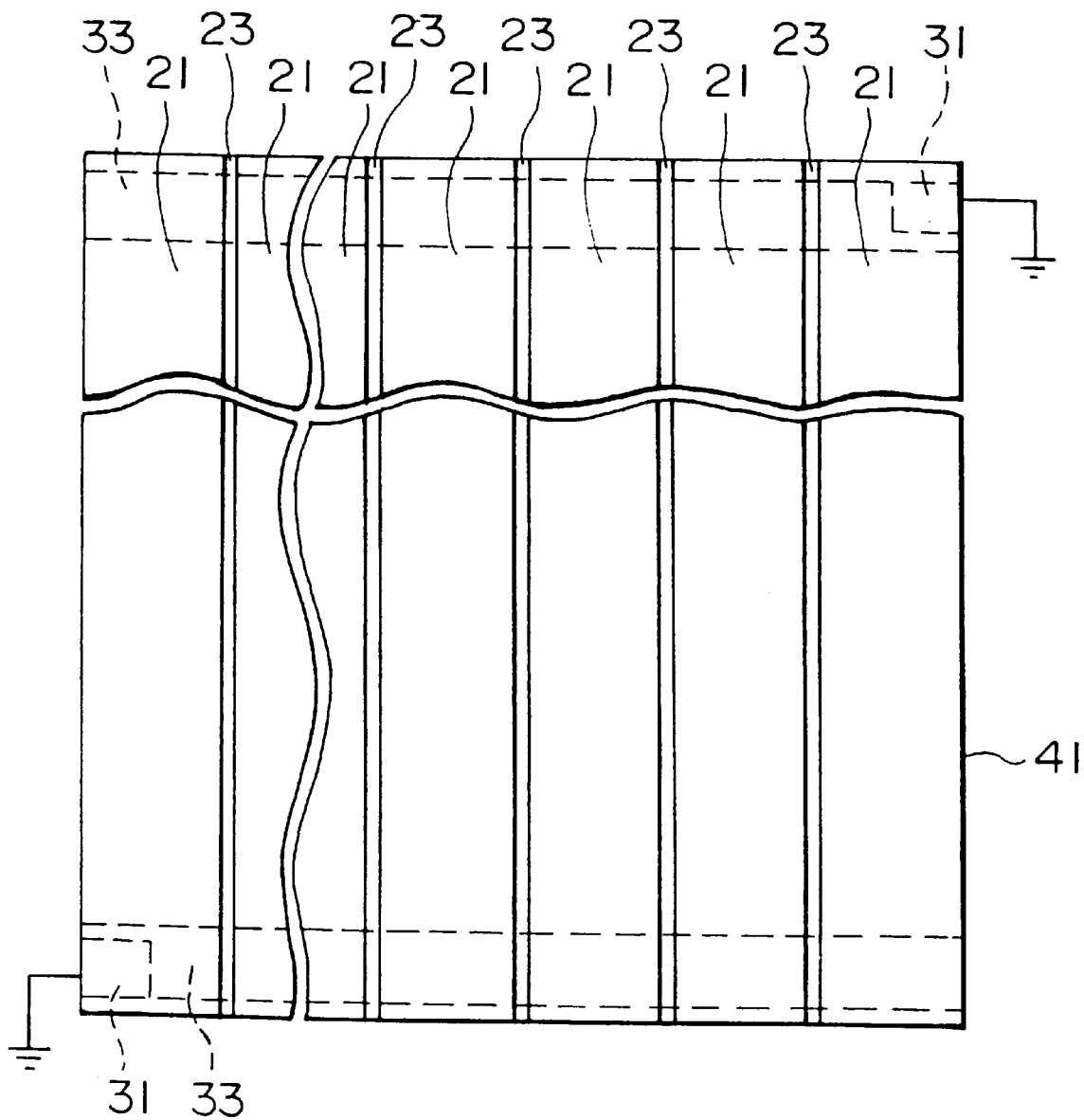
FIG. 3 is an explanatory view of another example of the installation method of the present invention.

FIG. 3 is an explanatory view of another example of the installation method of the present invention. A metal sheet 33 with high electroconductivity which is connected to the grounding terminal 31 is installed below the electroconductive flooring sheets 21 crossing the joints 23. Adopting this structure is equivalent to extending the effectiveness of the grounding terminal 31, and even in the case of a large room where the grounding terminal does not reach the center of the room the static electricity can be reliably eliminated.

In addition, by utilizing the configuration shown in FIG. 3 and by electrically connecting the joints 23 and the metal sheet 33 through the electroconductive flooring sheets 21 (for example, see FIG. 8), the electroconductive flooring sheets 21 need not necessarily be electroconductive in the direction of the thickness. Therefore, a foamed layer may be provided in the electroconductive flooring sheets to provide cushioning, and a non-electroconductive underlayer may be provided which can prevent dimensional deformation.

FIG. 4 is a perspective view, with part omitted, showing an embodiment of an electroconductive welding rod used in forming the joints 23. An electroconductive welding rod 11 is fabricated by forming a electroconductive coating layer 15 from a electroconductive coating material on the peripheral surface of a ribbon-shaped or rod-shaped joint material (core) 13 which is composed of a thermoplastic resin composition as the main component. The joint material 13 used can be the same as in a conventional welding rod for forming a joint material and is composed of a thermoplastic resin composition as the main component, including, for example, polyvinyl chloride, into which a plasticizer, a stabilizer, and various non-electroconductive fillers are blended. A colorant can be added to provide an optional color. Because the joint material 13 need not be electroconductive, the most preferable characteristics as a jointing material such as strength, color, softening characteristics, and the like, can be determined and the composition decided.

The electroconductive coating layer 15 is formed by blending an electroconductive material into a thermoplastic resin composition, including, for example, polyvinyl chloride or the like. In addition, a plasticizer, a stabilizer, various types of non-electroconductive fillers, colorants, and the like can be included in the blend.

The electroconductive material used is a mixture of potassium titanate and tin, zinc oxide, indium oxide, a mixture of indium oxide and tin oxide (ITO: Indium-Tin-Oxide), an electroconductive aluminum oxide (an electroconductive-material-coated aluminum oxide), various types of metal powders, a mica and tin combination, carbon fiber, carbon black, other electroconductive finely-divided particles, and electroconductive fibers. A white or light-colored material is preferable for this electroconductive material so that undesired coloring of the joint section is avoided. However, as will be later explained, the electroconductive coating layer 15 is not easily seen from the outside after the joint has been formed, therefore it is possible to use both a light colored material and carbon block, which is a representative electroconductive material. The magnitude of the electrical resistance of the electroconductive coating layer 15 is not limited, but a low resistance is desirable. A resistance in the order of $10^6 \Omega$ or less is preferable, in the range of $10^6$ to $10^{-3} \Omega$ more preferable, and in the range of $10^4$ to $10^{-1} \Omega$ most preferable. The magnitude of the resistance of the material as shown in FIG. 5 is the value measured by an ammeter 57 when a current flowing from a power source 55 is applied to a pair of electrodes 51, 53 in the radial direction of the electroconductive welding rod 11 which is 4 mm in diameter.

The electroconductive welding rod 11 shown in FIG. 4 can be manufactured by forming a ribbon- or rod-shaped joint material 13 by extrusion molding or the like, followed by coating with an electroconductive coating material in a paste sol state or in a state dispersed or dissolved in a suitable solvent, and drying to form the electroconductive coating layer 15. A suitable coating method such as dipping, spraying, brushing, or the like can be adopted.

FIG. 6A to FIG. 6D are a set of explanatory views showing an example of the joint forming method of the present invention.

Figure 6A:
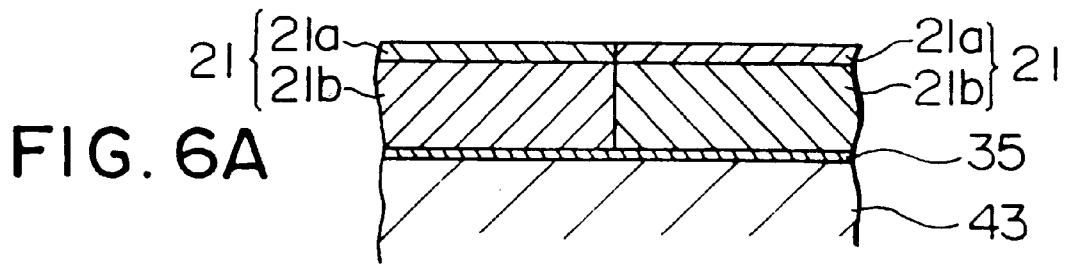
FIG. 6A to FIG. 6D are a set of sectional explanatory views showing an example of a joint-forming method for a joint for use in the present invention.

As illustrated in FIG. 6A, the electroconductive flooring sheets 21, 21 are laid in mutual contact on the floor base 43 and are attached to the floor base 43 with an adhesive 35. The flooring sheet 21 comprises a surface layer 21a which is comparatively thin and has a comparatively low resistance (specifically, which has superior conductivity); and a base layer 21b, which is comparatively thick and has a comparatively high resistance.

Figure 6B:
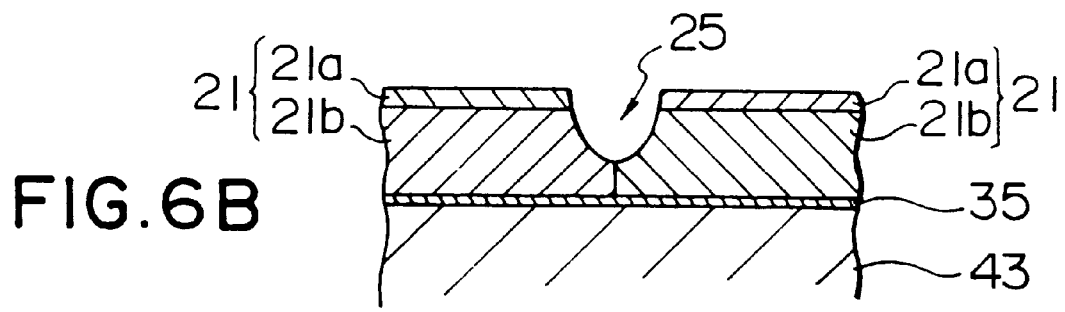

As illustrated in FIG. 6B, a joint-forming groove 25 is cut out in a U- or V-shape using a joint cutter.

Figure 6C:
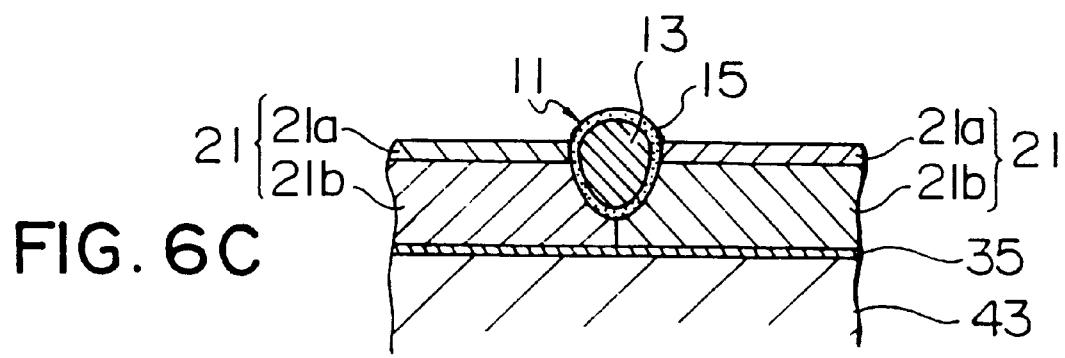

Next, as shown in FIG. 6C, the electroconductive welding rod 11 is softened and filled into the joint-forming groove 25 between the flooring sheets 21, 21 to weld the flooring sheets 21, 21 to one another.

Figure 6D:
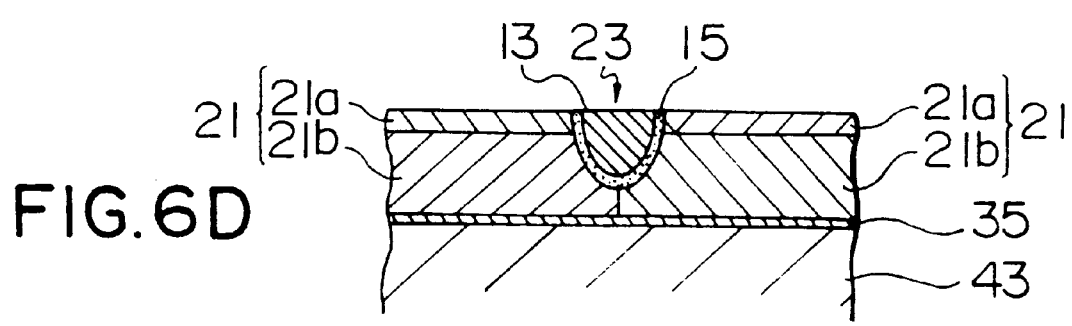

Further, as shown in FIG. 6D, the portion of the electroconductive welding rod 11 which protrudes above the flooring sheets 21, 21 is cut away to complete the joint 23.

The flooring sheets 21, 21 are electrically connected to provide an integrated member by the electroconductive coating layer 15 of the electroconductive welding rod 11. Accordingly, the entire aggregate of the flooring sheets 21 is formed as a continuous conductor through the joint sections. An electroconductive coating layer 15 is provided extending over the entire periphery of the joint 23 which connects the flooring sheets 21. Therefore, the surface layers 21a of the adjacent flooring sheets 21 are electrically integrated because the ends of the surface layers 21a of the flooring sheet 21 are reliably connected to the electroconductive coating layer 15.

Finally, because the surface of the welding material is cut away, as shown in FIG. 6C and FIG. 6D, the electroconductive coating layer 15 is almost invisible from the outside. With current technology relating to conductivity it is difficult to pass a current through resins which are completely colorless, but, as outlined in the foregoing explanation, because the electroconductive coating layer 15 becomes almost invisible, it has no great effect on the floor color.

Figure 7:
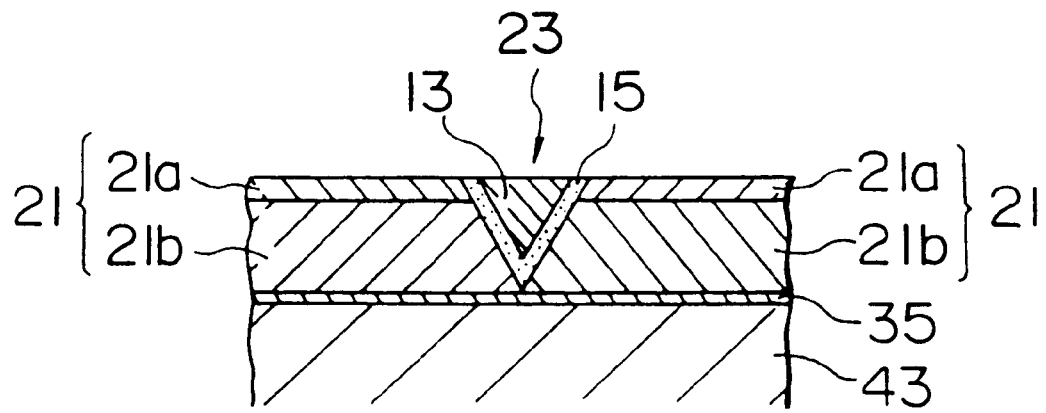
FIG. 7 is a sectional explanatory view of another example of a joint for use in the present invention.
Figure 8:
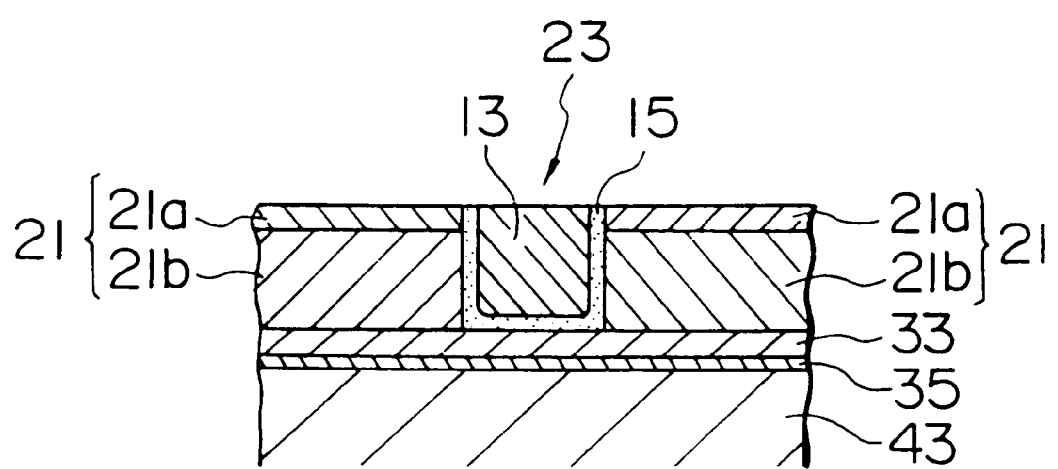
FIG. 8 is a sectional explanatory view of a further example of a joint for use in the present invention.
Figure 9:
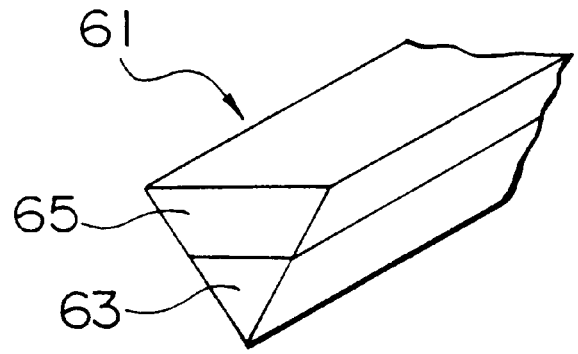
FIG. 9 is a perspective view of one example of a conventional joint welding rod.
Figure 10:
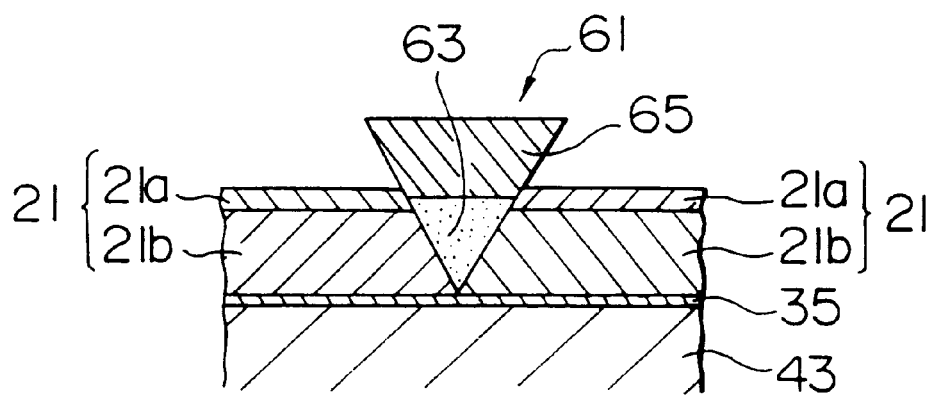
FIG. 10 is a sectional view of a welding method for a conventional electroconductive joint.

There is no particular restriction on the cross-sectional shape of the joint 23. For example, as shown in FIG. 7, a V- or U-shaped cross section which reaches almost to the floor base 43 is also acceptable. In addition, as shown in FIG. 8, the installation of the flooring sheets 21, 21 on the floor base 43 with the ends separated, and utilizing the space as the joint-forming groove to form the joint 23 is also acceptable. FIG. 8 also shows the metal sheet 33 of FIG. 3 installed.

What is claimed is:

1. An electroconductive welding rod for forming a joint comprising:
   a thermoplastic material formed as a rod;
   an electroconductive coating material disposed about a periphery of said rod of thermoplastic material;
   wherein said thermoplastic material includes a colorant therein; and
   wherein said rod has a polygonal cross-sectional shape.

2. An electroconductive welding rod for forming a joint comprising:
   a thermoplastic material formed as a rod;
   an electroconductive coating material disposed about a periphery of said rod of thermoplastic material;
   wherein said thermoplastic material includes a colorant therein; and
   wherein said rod has a V-shaped cross-sectional shape.

3. An electroconductive welding rod for forming a joint comprising:
   a thermoplastic material formed as a rod;

an electroconductive coating material disposed continuously about portions of said rod, while remaining portions of said rod are exposed, with said exposed portions extending continuously along a portion of said rod extending in an axial direction of said rod.

4. The electroconductive welding rod of claim 3, wherein said thermoplastic resin includes a colorant therein.

5. The electroconductive welding rod of claim 3, wherein said rod has a polygonal cross-sectional shape, and said electroconductive material has a U-cross-sectional shape extending along a length of said rod, such that said exposed portions of said rod are located opposite to a base portion of the U of the electroconductive coating material.

6. The electroconductive welding rod of claim 3, wherein said rod has a triangular cross-sectional shape, and said electroconductive material has a V-shaped cross-section.

7. The electroconductive welding rod of claim 3, wherein said rod has a curved perimeter in cross-section and a flat surface, and wherein said flat surface is exposed, and further wherein said electroconductive coating material is disposed about said curved perimeter.

* * * * *

UNITED STATES PATENT AND TRADEMARK OFFICE
CERTIFICATE OF CORRECTION

PATENT NO. : 6,150,018
DATED : November 21, 2000
INVENTOR(S) : Toru Iijima et al.

It is certified that error appears in the above-identified patent and that said Letters Patent is hereby corrected as shown below:

<u>Title page,</u>
Item [73], the Assignee's information is incorrectly listed. Item [73] should read as follows:
-- [73] Assignee: Tajima Incorporated, Tokyo, Japan --

Signed and Sealed this

Twenty-ninth Day of January, 2002

*Attest:*

*Attesting Officer*

JAMES E. ROGAN
*Director of the United States Patent and Trademark Office*